United States Patent [19]

Conrad

[11] Patent Number: 4,721,458
[45] Date of Patent: Jan. 26, 1988

[54] GAS FEEDING DEVICE FOR FEEDING A COMBUSTIBLE GAS MIXTURE CONSISTING OF AT LEAST TWO COMPONENTS

[75] Inventor: Hans-Jürgen Conrad, Rutesheim, Fed. Rep. of Germany

[73] Assignee: Robert Bosch GmbH, Stuttgart, Fed. Rep. of Germany

[21] Appl. No.: 932,503
[22] PCT Filed: Mar. 5, 1986
[86] PCT No.: PCT/DE86/00084
§ 371 Date: Oct. 3, 1986
§ 102(e) Date: Oct. 3, 1986
[87] PCT Pub. No.: WO86/05725
PCT Pub. Date: Oct. 9, 1986

[30] Foreign Application Priority Data
Mar. 30, 1985 [DE] Fed. Rep. of Germany ....... 3511731

[51] Int. Cl.⁴ .................................. F23C 11/04
[52] U.S. Cl. ............................... 432/205; 431/1; 431/90; 432/25
[58] Field of Search ............... 431/1, 90; 432/25, 205

[56] References Cited

U.S. PATENT DOCUMENTS 4,474,547 10/1984 Drexel et al. ................. 431/1
4,591,339  5/1986 Conrad ....................... 431/1

Primary Examiner—Carroll B. Dority, Jr.
Attorney, Agent, or Firm—Michael J. Striker

[57] ABSTRACT

A gas feeding device is suggested which is used for feeding a combustible gas mixture consisting of at least two components into a combustion chamber of a thermic deburring installation for treating work pieces (3) by means of temperature and pressure shocked formed by igniting the gas mixture. The device includes a control circuit used as a dosaging device which is adjustable to different mixing ratios. The central circuit includes a through flow amount meter in each of the gas feeding lines, a measuring value comparator (31) and a dosaging valve controlled by the measuring value comparator in one of the feeding lines. Shut-off valves are provided in the feeding lines between the flow amount meters and the combustion chamber which react to a signal issued by a storage or counting device connected to one of the flow amount meters (24 or 29) in response to the flow of a preselectable amount of gas.

3 Claims, 1 Drawing Figure

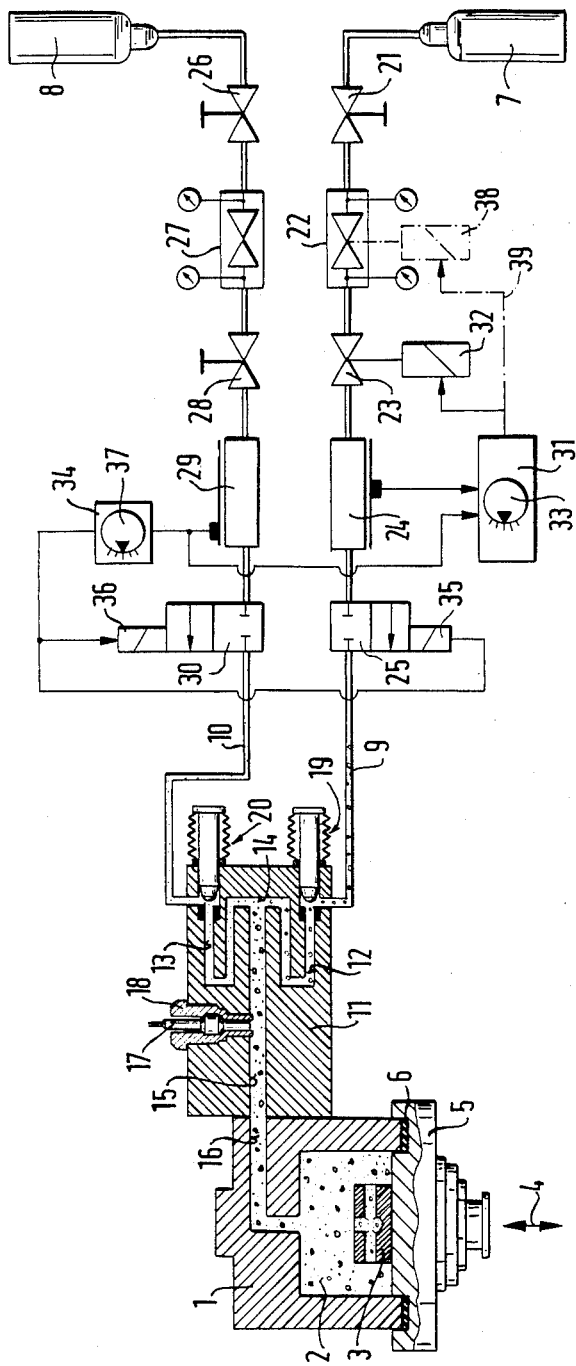

GAS FEEDING DEVICE FOR FEEDING A COMBUSTIBLE GAS MIXTURE CONSISTING OF AT LEAST TWO COMPONENTS

BACKGROUND OF THE INVENTION

The present invention relates to a gas feeding device for feeding multi-component combustible gas mixture into a combustion chamber. in installations for a thermal deburring of work pieces an unconcentrated sputtering occurs, whereby the total work piece is subjected to a heat shock. Preferably, the corners and edges are sputtered, because these locations absorb particularly a great deal of heat with a large surface and a small volume and are thereby oxidized or burnt. The heat shock is generated by burning off a combustion gas-oxygen mixture, whereby hydrogen or natural gas or methane is used as a combustion gas. The amount of gas in the combustion chamber and the admixing ratio of the gas components are available for controlling the deburring process. These two values of influence determine the amount of energy and the temperature. In each case metals are deburred with an excess of oxygen, because otherwise only a melting off but no burning off of the burs would occur. The more oxygen is present in the combustion chamber, the more intensive is the deburring effect with respect to radial formations and the amount of deburring.

In known deburring installations the gas admixing components are at first fed from supply containers into a dosaging cylinder and subsequently are pushed into the combustion chamber by means of a piston in the dosaging cylinder. This process may be repeated frequently for a pressure build up in the combustion chamber. The piston stroke is steplessly adjustable, however is uniformly large for combustion gas and oxygen. The pressure in the dosaging cylinders is divided through reduction valves in the feeding lines and is independently adjustable. For example, with the assistance of these reduction valves the pressure of bot gas components can be varied from 0 to 20 bar. The parameters to be adjusted are differently dependent from form, size and material of the work pieces to be deburred and must be determined by means of tables or if this is not possible empirically. Thereby the operator must bring three values, namely the filling volume of the dosaging cylinders, the filling pressure in the oxygen cylinder and the filling pressure in the combustion gas-dosaging cylinder, to a ratio with each other to obtain optimal results.

SUMMARY OF THE INVENTION

It is an object of the present invention to provide an improved gas feeding device for feeding multi-component combustible gas mixture into a combustion chamber.

In contrast to the above described conventional devices the gas feeding device in accordance with the invention is advantageous in that the gas mixing components can be fed from the supply containers through the feeding lines directly into the combustion chamber or into a mixing chamber which is positioned before the feeding device. Thus, an expensive dosaging device with dosaging cylinders and gas pushing pistons is omitted. Furthermore, the gas feeding device in accordance with the invention is advantageous in that the operator must only preselect two values, namely the mixing ratio in the control circuit and the amount of gas at a storage and counter stage, so as to generate different amount ratios or mass ratios of the gas components. The gas component which represents the leading dimension can be fed into the combustion chamber with a constant pressure and in different amounts, while the second gas component is automatically fed in a defined amount which is dependent from the adjustment of the control circuit. The amount of the fed gas and thereby the combustion filling pressure is determined by the time span which passes between the opening of the shut off valves and the closing of the same caused by a signal from the storing or counting stag, while the mixing ratio of the gas components is predetermined by the adjustment of the control circuit. Hence, this is a superposition of a measuring process of the amount of gas and a control process of the mixing ratio of the gas components. The simplification of the filling process is in particular advantageous in that during required new settings of the installations the correct setting values can be found very rapidly, e.i., with only a few "trial tests" and without endangering the parts to be deburred due to thermal overloading. The rapid finding of the nominal values saves oxygen and combustion gas and moreover reduces the material wear of the combustion space contained in the combustion chamber. By omitting the dosaging device with the dosaging cylinders and the gas pushing pistons the maintenance and the repair of the installation can be further facilitated and simplified. Moreover, the control circuit assures that the mixing ratio remains constant during the filling operation.

Advantageous further embodiments and improvements of the device stated in the main claim are made possible by the measures stated in the subclaims. It is particularly advantageous with respect to a controlled preparation of the mixing ratio that the feeding lines which extend from the supply containers contain one each pressure reduction valve which are set to the maximum combustion chamber filling pressure and that between these valves and the flow through amount measuring devices the dosaging valve is provided in one of the feeding lines controlled by the measuring value comparator. Another, particularly economical structure consists in that one each pressure reduction valve is provided in the feeding lines between the gas supply container and the flow through amount measuring device, whereby the valve for the gas component which represents the leading value is set to a fixed value and that the valve for the gas component representing the control value is mechanically controlled by the measuring value comparator.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE schematically illustrates an installation for thermal deburring of work pieces with the structural elements of the invention.

DETAILED DESCRIPTION OF THE PREFERRED EMBODIMENT

A work piece treatment chamber is designated with the reference numeral 1. In a combustion chamber 2 of the workpiece treatment chamber a workpiece 3 to be deburred is placed. The work piece 3 is supported on a locking plate 5 movable in the direction of double arrow 4, which plate is mounted on the front face 6 of treatment chamber 1 before filling the combustion chamber 2 with a combustion gas-oxygen mixture and before igniting the same. A seal 6 is mounted between plate 5 and the front face.

The gas components of the combustion gas-oxygen mixture are fed from one each supply container 7 for combustion gas or 8 for oxygen into a mixing block 11 by means of pressure resistant lines 9 or 10. This mixing block consists of a massive metal block, wherein gas feeding bores 12,13, a mixing chamber bore 14 and an ignition bore 15 are formed. The gas mixture flows into the combustion chamber 2 through the ignition bore 15 and a further bore 16 which is formed in the treatment chamber 1. A spark plug 17 is used for igniting the mixture extending into bore 15 and is mounted in an insert 18 of the mixing block 11. One each valve 19 or 20 are disposed in the mixing block 11 between the feeding lines 9,10 and the feeding bores 13,14. At the start of feeding the gas these valves are opened by spring force and are closed again after the gas feeding operation is completed. The locking of the valves 19,20 against the spring force and the maintaining of this locking during the deburring operation is preferably performed by hydraulic force.

The feeding line 9 for the combustion gas contains a manually actuated shut-off valve 21 which extends from the gas supply container 7, a pressure reduction valve 22, a dosaging valve 23, a flow through amount-measuring device 24 and a shut off valve 25. In the same sequence a pressure reduction valve 27, a dosaging valve 28, a flow through amount-measuring device 29 and a shut-off valve 30 are disposed in the feeding line 10 for oxygen. The pressure reduction valves 22,27 are set, for example, to the maximum permissible combustion chamber-filling pressure of 30 bar.

The dosaging valves 23,28 are used for predetermined flow through amounts of combustion gas or oxygen per time unit. The dosaging valve 28 for oxygen is set for a fixed value amount of flow through, while the dosaging valve 23 for the combustion gas is provided with a mechanically adjustable diaphragm, so as to regulate the amount of combustion gas to be admixed to the oxygen. The flow through amount-measuring devices 24 and 29 pick up the amounts of combustion gas and oxygen which flow per time unit and form therefrom preferably electrical signals which are fed to a measuring value comparator 31 in the form of amount-proportional currents, voltages or sequences of pulses. Membrane systems, compression disks or impellers with subsequent measuring transformer may be utilized as pick up systems in the feeding lines 9 and 10, for example, for forming electrical signals by the movement of the parts of the pick up system suitable for further processing. A differential signal appears at the output of the measuring value comparator 31 which controls an electric drive system 32 for the diaphragm of dosaging valve 23. For example, an electromagnet may be used for such a drive system, whose anchor is stepless adjustable depending from the value of the applied voltage. It would also be feasable to use a step switching motor to which the output signal of the measuring value comparator 31 is fed in form of a pulse number proportional thereto.

The amounts of through flow of the two gas components flowing in lines 9,10 are controlled in a predetermined ratio with respect to each other before they enter the mixing block 11 by parts 23,24,28,29,31,32. Both throughflows are measured. The measuring value comparator controls the flow of the combustion gas in feeding line 9 through the dosaging valve 23, thus assuring the maintenance of a set combustion gas-oxygen ratio. The flow of oxygen defines the leading value, the combustion gas flow is the control value, the interfering value is defined by the prepressure in the oxygen-feeding line and the set dimension is the position of the combustion gas-dosaging valve 23. Naturally, the combustion gas flow could be used as the leading value.

In order to be able to adjust the mixing ratio of oxygen and combustion gas to different values a set member 33 is provided on the measuring value comparator 31 with the assistance of which the ratio of the signals being fed by the leading value and the set value through the through flow amount measuring device 24,29 is changeable. In case of a voltage comparison a changeable resistor may be provided in the line which feeds the voltage signal of the control value, for example. Depending on the setting of this resistor the control value, e.i., the combustion gas feeding per unit time is adjusted to larger or smaller values through the dosaging valve 23 in comparison to the oxygen feeding. Instead of adjusting in the measuring value comparator 31, the setting of the different mixing ratios could also be performed in the through flow measuring devices by installing adjustable throttles or the like.

In addition to the mixing ratio of the two gas components the amount of the gas mixture must be considered which is fed into the combustion chamber 2 and must be fixed from time to time. This is performed by means of the shut-off valves 25 or 39 which are mounted in the feeding lines 9,10. These valves react to a storage or counting stage 34 which is connected to the through flow amount measuring device 29 for oxygen. A bistable multivibrator with RC-characteristics may be used as a storage into which a flow amount dependent voltage is fed from the flow amount measuring device 29 and which delivers an output signal to the locking magnets 36 or 35 of the valves which trigger the reaction of the shut off valves 25,30 after reaching a predetermined charge level of a condenser. Instead of such a storage one could use a counting stage which delivers an output signal causing the reaction of the shut-off valves after receiving an adjustable number of pulses. The storage or counting stage 34 is provided with a setting device 37 for setting the point in time of the signal issuance, whereby different amount of fillings can be preselected with this setting device.

The gas filling pressure and thereby the amount of the filling required for the deburring depends substantially from the material of the piece. For methane-oxygen mixtures one should calculate 3 to 7 bar for zinc alloys, 5 to 10 bar for aluminum, 8 to 40 bar for brass and steel.

Thereby, the smaller number stands for thin burs and small chamber fillings, the greater number for larger burs, edge roundings and larger chamber filling.

The dosaging valves 23,28 can be omitted if instead these values, the pressure reduction valve 22 is used for feeding the setting value and if it is controlled by the output signal of the measuring value comparator 31. An electric setting drive 38 and a control line 39 for this purpose are illustrated in dotted lines in the drawing. This type of structure is particularly inexpensive, however it requires a very rapid reacting control circuit, since the time span until reaching a defined chamber filling pressure is considerably shorter than that with the use of additional dosaging valves which reduce the flow speed of the gases.

It will be understood that each of the elements described above, or two or more together, may also find a useful application in other types of gas feeding devices for feeding combustible mixture of at least two components differing from the types described above.

While the invention has been illustrated and described as embodied in a gas feeding device for feeding combustible gas mixture which contains at least two components, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. In a gas mixture feeding device for feeding a combustible gas mixture consisting of at least two gas components into a combustion chamber of a thermal deburring installation for treating work pieces by means of temperature and pressure shocks formed by igniting the gas mixture, comprising a feeding line for each gas component, an adjustable dosaging device provided in each feeding line for the amount of gas and the mixing ratio of the gas components, the improvement comprising a control circuit for said dosaging device, said control circuit being adjustable to different mixing ratios and including a through-flow amount metering means (24 or 29) provided in each of the feeding lines (9, 10), a measuring value comparator (31), and said dosaging device including a valve (22 or 23) provided at least in one of the feeding lines and controlled by said measuring value comparator, and shut-off valves (35,25 or 30,36) provided in each feeding line between the flow amount metering means and the combustion chamber (2); and storage and counting means provided in one of said feeding lines, said shut-off valves reacting to a signal issued by said storage and counting means (34) which is connected to a respective flow amount metering means in accordance with a through flow of a preselectable amount of gas.

2. Gas mixture feeding device in accordance with claim 1, wherein each of the feeding lines (9,10) further includes a gas supply container (7 or 8) and a pressure reduction valve (22 or 27) adjusted to a maximal combustion chamber filling pressure, said dosaging devices (23,28) being positioned in at least one of the feeding line between said pressure reduction valve and said flow amount metering means (24,29) and one of said dosaging devices being controlled by said measuring value comparator (31).

3. Gas mixture feeding device in accordance with claim 1, wherein each of the feeding lines includes a gas supply container and a pressure reduction valve positioned in a respective feeding line between an assigned gas supply container and an assigned flow amount metering means (24,29), one of the pressure reduction valves (27) being set to a fixed value for the gas component representing a leading value and another of said pressure reduction valves (22) for the gas component representing a control value being controlled by said measuring value comparator (31).

* * * * *